United States Patent [19]

Airhart

[11] Patent Number: 4,875,544
[45] Date of Patent: Oct. 24, 1989

[54] TRANSDUCER FOR INDUCING SEISMIC SIGNALS INTO AN ELASTIC MEDIUM

[75] Inventor: Tom P. Airhart, Plano, Tex.
[73] Assignee: Atlantic Richfield Company, Los Angeles, Calif.
[21] Appl. No.: 306,633
[22] Filed: Feb. 2, 1989
[51] Int. Cl.[4] .............................................. G01V 1/047
[52] U.S. Cl. ..................................... 181/113; 181/401
[58] Field of Search ................ 181/0.5, 113, 114, 121, 181/400, 401; 367/189, 191, 7

[56] References Cited

U.S. PATENT DOCUMENTS

| | | | |
|---|---|---|---|
| 4,270,626 | 6/1981 | Pritchett | 181/113 |
| 4,284,163 | 8/1981 | Pritchett | 181/113 |
| 4,296,828 | 10/1981 | Layotte et al. | 181/121 |
| 4,298,086 | 11/1981 | Pritchett | 181/113 |
| 4,712,641 | 12/1987 | Chelminski | 181/113 |
| 4,766,974 | 8/1988 | Cole et al. | 181/113 |

*Primary Examiner*—Brian S. Steinberger
*Attorney, Agent, or Firm*—Baker, Mills & Glast

[57] ABSTRACT

A coupling member for coupling forces generated by a seismic transducer into an elastic medium, such as the earth, wherein the coupling member includes a plurality of discrete cleat members that project downwardly from the lower surface of the coupling member and each of the cleat members has lateral sides, including arcuate portions arranged generally tangent to the sides and to the lower surface of the coupling member whereby the elastic medium is compressed, thereby preventing movement of the coupling member.

1 Claim, 1 Drawing Sheet

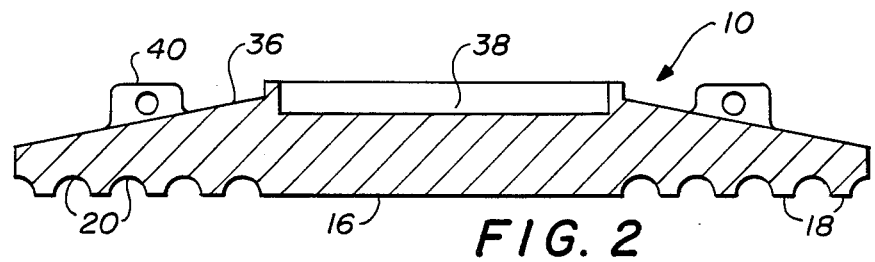
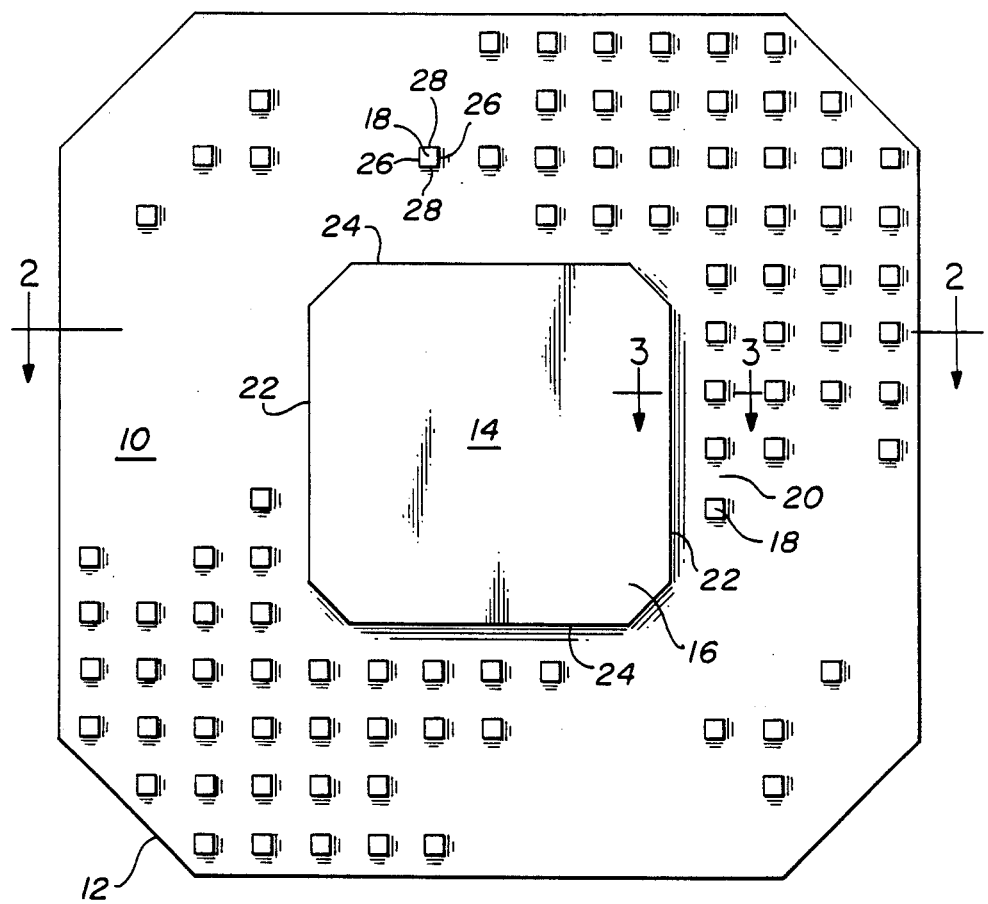
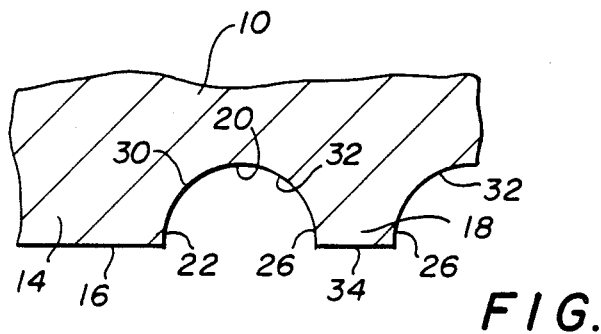

TRANSDUCER FOR INDUCING SEISMIC SIGNALS INTO AN ELASTIC MEDIUM

TECHNICAL FIELD OF THE INVENTION

This invention relates generally to transducers for inducing seismic signals into an elastic medium, such as the earth. More particularly, but not by way of limitation, this invention relates to an improved transducer having a plurality of discrete cleat members projecting therefrom for coupling the seismic signal into the earth.

BACKGROUND OF THE INVENTION

U.S. Pat. Nos. 4,270,626; 4,284,163; and 4,298,086, issued respectively on June 2, 1981; Aug. 18, 1981; and Nov. 3, 1981. Each of the aforementioned patents were issued to William C. Pritchett.

The foregoing patents each disclose transducer means for coupling horizontally-directed forces of a seismic vibrator into the earth. Theoretically, if the transducer remains motionless relative to the ground surface during vibration, the maximum vibrational force is being imposed upon the earth on which the transducer is resting.

Initially, seismic devices were utilized with vibrator or impact mechanisms which impose their forces perpendicularly with respect to the means utilized in coupling the transducer into the earth. More recently, both the vibratory seismic generators, as indicated in the above patents, and the impact-type seismic generators are being inclined from the vertical so that they engage the coupling members at an angle other than perpendicularly with respect to horizontal.

The foregoing patents set forth in detail the difficulties encountered when trying to couple the vibratory seismic transducers into the earth. The problem of maintaining the coupling member motionless so that the maximum force is transferred into the earth is very substantial in the impact-type seismic generators due to the large masses involved. For example, in the impact-type seismic generators currently being utilized, a weight of approximately 5,000 pounds is accelerated to a velocity of over 25 miles an hour over a distance of two to three feet into engagement with the coupling member. Manifestly, it will be appreciated that when such weight is being propelled at an angle relative to vertical, a relatively large horizontal force vector is generated onto the baseplate or coupling member. Such horizontal force vector tends to cause the coupling member to move along the surface of the earth with the resulting loss in efficiency of the seismic generator.

Also, problems are often encountered if the coupling member shifts when multiple impactors are used to produce a single shock wave. For example, the travel distance from the release of the impact member to its impact point on the coupling member must remain fixed or the impact members will not strike the coupling member at precisely the same time.

SUMMARY OF THE INVENTION

An object of this invention is to provide a transducer for inducing seismic waves into an elastic medium, such as the earth, with the maximum force transfer efficiency so that the greatest seismic wave is generated for the amount of force exerted by the seismic generator.

This invention, then, provides a transducer for inducing seismic waves into an elastic medium wherein the transducer includes a coupling member adapted to couple energy from the transducer into the medium. The improvement comprising a plurality of discrete cleat members projecting from the lower surface of the coupling member, each cleat member has lateral sides that include arcuate portions generally tangent to the lateral sides and to the lower surface of the coupling member whereby the maximum compressive forces are exerted on the elastic medium which tend to prevent movement of the coupling member relative to the elastic medium.

BRIEF DESCRIPTION OF THE DRAWING

The foregoing and additional objects and advantages of the invention will become more apparent when the following detailed description is read in conjunction with the accompanying drawing wherein:

FIG. 1 is a bottom plan view of a coupling member that is constructed in accordance with the invention.

FIG. 2 is a cross-sectional view taken generally along the line 2—2 of FIG. 1.

FIG. 3 is an enlarged fragmentary cross-sectional view taken generally along the line 3—3 of FIG. 1.

DETAILED DESCRIPTION OF THE PREFERRED EMBODIMENT

Referring to the drawing and to FIG. 1 in particular, shown therein and generally designated by the reference character 10 is a coupling member for a seismic transducer that is constructed in accordance with the invention.

As shown therein, the coupling member 10 is generally rectangular in configuration and may have the corners 12 removed therefrom either on a diagonal as illustrated or radiused.

Near the center of the coupling member 10 there is provided a downwardly-projecting, ground-engaging portion 14 having a surface 16 thereon. Surrounding the ground-engaging portion 14 is a plurality of spaced, downwardly-projecting, cleats or lugs indicated by the reference character 18. Each of the cleats 18 projects downwardly from a downwardly-facing lower surface 20 on the coupling member 10. In FIG. 1, it can be seen that the ground-engaging portion 14 includes lateral sides 22 and 24. Each of the cleats 18 also includes lateral sides 26 and 28.

As may be seen most clearly in the enlarged fragmentary view of FIG. 3, the lateral sides on the ground-engaging portion 14 connect with the lower surface 20 of the coupling member 10 through a radius 30 which is tangent to the lower surface 20 and to the lateral sides 22 of the ground-engaging portion 14. Similarly, each cleat 18 has the lateral sides thereof connected by arcuate portions 32 with the lower surface 20 of the coupling member 10. The arcuate portions 32 are tangent to the lateral sides of the cleat members and also to the lower surface 20 of the member 10.

The cleats 18 are truncated, that is, each has a planar lower surface 34 that lies generally in the same plane as the lower surface 16 of the ground-engaging portion 14.

Referring to FIG. 2, it can be seen that an upper surface 36 of the coupling member 10 slopes generally upwardly and inwardly, having a cavity 38 formed therein for receiving a removable impact plate (not shown). Also located on the upper surface 36 of the member 10 are suitable mounting lugs 40 which may be arranged in any desirable manner to connect the coupling member 10 to the remainder of the seismic transducer apparatus.

OPERATION OF PREFERRED EMBODIMENT

In utilizing the coupling member 10, it is most often mounted as part of a seismic transducer that is truck-mounted for mobility. When constructed in this manner, the coupling member 10 and truck are positioned at the desired location. The coupling member is lowered into engagement with the surface of the earth. This is usually accomplished by hydraulic cylinders located on the truck. Actuation of the cylinders is continued until the weight of the vehicle is placed upon the coupling member 10.

The coupling member 10 is very heavy, and the additional weight of the vehicle being placed thereon, forces the member 10 into the ground. The ground, which is considered to be an elastic medium, compresses as the cleats 18 and the ground-engaging portion 14 are forced thereagainst by the weight of the vehicle. In addition, downward force, due to vertical component of impact, applies additional compression force on the earth. Through such compression, the earth becomes much more rigid, and consequently, the plate is less likely to be moved upon impact.

When desired, the seismic impact device is actuated, propelling the weighted impact member toward the coupling member 10 and striking the coupling member at the desired time and angle. As previously mentioned, the weighted impact member weighs approximately 5,000 pounds and is propelled at high speed into the member 10. Due to the compression of the earth and the holding ability of the member 10, the maximum amount of the force exerted by the weighted impact member will be transferred into the earth, thus creating the most efficient seismic wave.

Having described but one embodiment, it will be understood that that embodiment is presented by way of example only and that many modifications and changes can be made thereto without departing from the spirit or scope of the invention.

What is claimed is:

1. In a transducer for inducing seismic waves into an elastic medium, including a coupling member adapted to couple energy of such transducer into said medium, the improvement comprising:

a plurality of discrete cleat members projecting from a lower surface of said coupling member, each said cleat member having lateral sides including arcuate portions generally tangent to said sides and to said lower surface of the coupling member, each said cleat member being truncated to provide a ground engaging surface disposed in a plane substantially parallel to said lower surface; and a centrally-located, ground-engaging portion projecting from said lower surface and surrounded by said cleat members, said ground-engaging portion including a ground-engaging surface disposed in substantially the same plane as the ground-engaging surfaces on said cleat members, lateral sides including arcuate portions generally tangent to said lateral sides and to said lower surface on said coupling member, said ground-engaging surface on said ground-engaging portion being substantially greater in area than the ground-engaging surface on any of said cleat members, whereby the elastic medium is compressed preventing movement of said coupling member and directing the transducer force into the elastic medium to produce the seismic waves.

* * * * *